Aug. 11, 1964  J. L. LEE, JR  3,143,847

TIME REGISTERING MECHANISM

Filed June 15, 1961

JAMES L. LEE, JR.
INVENTOR.

BY *R. T. Spenney*
ATTORNEY

United States Patent Office 3,143,847
Patented Aug. 11, 1964

3,143,847
TIME REGISTERING MECHANISM
James L. Lee, Jr., First National Bank Bldg.,
Tampa, Fla.
Filed June 15, 1961, Ser. No. 117,230
2 Claims. (Cl. 58—22.9)

This invention relates to time registering mechanisms and is particularly concerned with the indication of individual time increments.

In many instances, particularly in the professional field, there is a need for the recordation of lapsed periods of time. While the present invention is broadly applicable in a wide variety of circumstances, an illustration of the need for a device of the present type is exemplified in the legal practice. Throughout a day of office work, a lawyer is frequently called upon to devote time to many different clients. In some instances the time consumed is in connection with the conference with a client, and in other instances it may be in preparing legal documents, correspondence, phone calls or library research. Throughout the day such lapsed periods of time may be quite diversified, being attributable to entirely different clients. It is extremely difficult at the end of the day, or at the end of the week, to properly allocate the time spent unless some record is made at the time when services are rendered.

It will of course be understood that the same problem may arise in various other fields, from simple mechanical operations as in repair work, in factory procedures, and medical as well as legal practices. Thus, it will be understood that the suggestion of the use of the present invention in the legal field is by way of illustration rather than as to suggest that the present invention is limited or confined to this practice.

It is an object of the present invention to provide a novel, simple and improved means for registering individual time increments allotted to various projects. A further object of the present invention is to provide time mechanism with a plurality of the visual registers, so that the lapsed time increment chargeable to different projects may be recorded and noted. Another object of the invention is to provide time mechanism including a plurality of individual indicating dials, together with means by which the individual dials may be activated by a single horological instrument. A further object of the invention is to provide means whereby individual time increments may be cumulatively registered on a selected indicating means so that individual lapses of time, assignable to specific tasks but added at spaced intervals, may be shown as a total lapsed time for the specific project to which they are properly assigned. Numerous other objects, features and advantages of the present invention will be apparent from consideration of the following specification, taken in conjunction with the accompanying drawings, in which—

Figure 1:
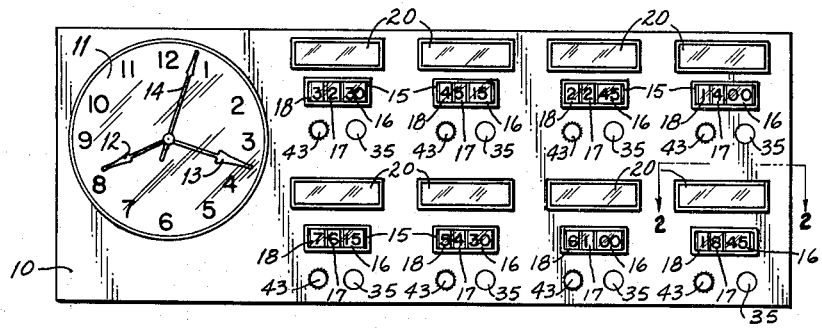
Figure 2:
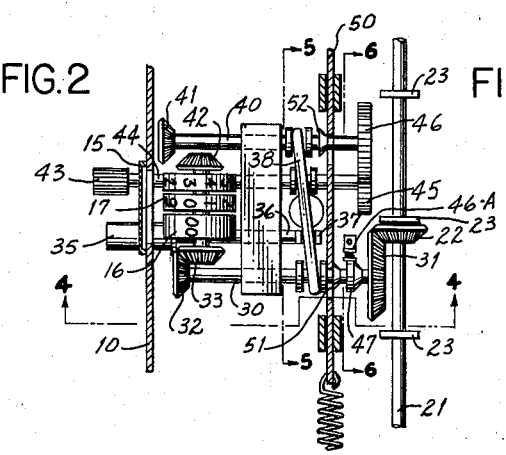
Figure 3:
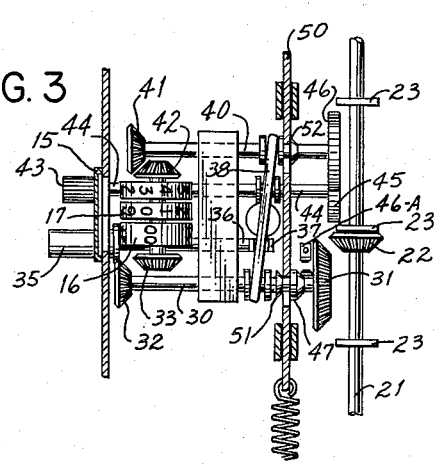
Figure 4:
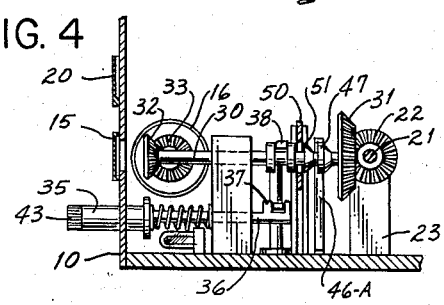
Figure 5:
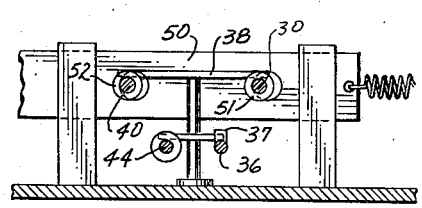
Figure 6:
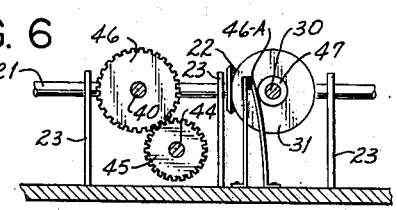

FIG. 1 is a front elevation of one preferred embodiment of the present invention, FIG. 2 is a sectional view taken on line 2—2 of FIGURE 1, FIG. 3 is a view similar to FIGURE 2 showing the parts arranged in recording position, FIG. 4 is a sectional view taken on line 4—4 of FIGURE 2, FIG. 5 is a sectional view taken on line 5—5 of FIGURE 2, and FIG. 6 is a sectional view taken on line 6—6 of FIGURE 2.

In that form of the invention here shown by way of illustration, there is disclosed, as in FIGURE 1, the front panel 10 of a suitable enclosing casing not otherwise disclosed, which may of course, be of any desired dimension, form, or configuration as circumstances may dictate. There is disclosed at 11 in FIGURE 1, a clock dial including hour and minute hands 12 and 13 respectively and a second sweep hand 14. From this illustration, it will be understood that the clock mechanism of any desired sort will be included within the casing which may be operated either by spring or electrically. The present invention is not limited nor confined to the exterior of the clock face, but it is deemed appropriate that the device may present the clock for normal visual observation of the time of the day. The clock mechanism being preferably of conventional form, well known to those versed in the art and forming no part of the present invention, except as for driving the time shaft, is not deemed necessary of detailed disclosure.

Associated with the clock dial of FIGURE 1, there is provided a series of windows 15 through which there is displayed second, minute and hour indicating drums 16, 17 and 18, more clearly disclosed in FIGURES 2 and 3 respectively. Above each of the windows 15 there is preferably provided designation receiving racks 20 which may bear data indicating the client, project, patient, or the like, to which any increment of time is to be charged. As will be hereinafter more fully disclosed, it will be understood that the clock mechanism is adapted to rotate in timed sequence, horizontal time shafts 21, there being provided one shaft for each horizontal bank of the windows 15 and their associated time increment drums.

Referring now more particularly to FIGURES 2 to 6 of the drawings, it will be seen that each of the time shafts 21 is provided with a bevel gear 22, each gear being adapted to be selectively meshed with a companion bevel gear 31 for each of the time increment displaying drums. The shafts 21 are supported within the casing in suitable manner as by the brackets 23. At each station associated with each window 15, there is provided a transverse shaft 30, the rear extremity of which has mounted thereon for rotation therewith the companion bevel gear 31. The forward end of shaft 30 carries a bevel gear 32 rotatable therewith and engageable upon reciprocation of the shaft with a bevel gear 33 on the timing mechanism. It will be understood that the arrangement is such that for one complete revolution of the second drum 18, the minute drum 17 will be rotated one tenth of a revolution, and in like manner the hour drum 16 will be rotated by the minute drum 17 one tenth of a revolution for each full rotation of the minute drum, representing the elapsed period of 60 minutes. Since the arrangement of these drums for such rotation, one in response to another, is common knowledge in the art, the invention as here disclosed is not encumbered by detailed structure for the sequential operation of the drums.

For shifting the shaft 30 to engage and disengage the bevel gears 31 and 32, there is provided a push-button 35 extending transversely with respect to the shafts 21 at each window station of the device. Push-button 35 is secured to a shaft 36 extending rearwardly and formed with a hooked end 37 which engages a pivoted operating link 38. This arrangement is such that when push-button 35 is depressed inwardly, the link 38 will move the rod 30 rearwardly causing the bevel gears 31 and 32 to enmesh with and be driven by their companion gears 22 and 33 thus to turn the time drums from the timer shaft 21 at any station at which the button is depressed.

Concurrently with the inwardly depression of the button 35, the opposite end of the operating link 38 will move the shaft 40 forwardly to disengage bevel gear 41 and its companion bevel gear 42 and hence preclude a shifting of the time mechanism by the knurled time reset button 43, mounted on shaft 44, and carrying gear 45 for enmeshment with a reset gear 46.

Conversely, inward movement of the shaft 44 by pressure on the knurled button 43 will cause a rearward movement of the shaft 44 to enmesh the bevel gear 41 with the reset bevel gear 45, whereupon rotation of the knurled button 43 will reset the dials to zero setting for subsequent operation.

As an indication of the fact that a station is in operative association with the timing shaft 21, a switch 46 is provided, arranged for contact with an operating lobe 47 on the shaft 30. Thus as the shaft is depressed, the lobe will engage the switch to energize a light circuit for the button 35. To ensure locking of the shafts in their adjusted position, a spring tension plate 50 is provided movable by either lobes 51 or 52 so that the shafts may be inadvertently shifted. The depression of the button 35 therefore locks the reset button against displacement while the shaft 30 is in inward position.

From the foregoing it will be seen that the present invention provides a novel, simple and improved means for indicating elapsed time in association with one of a particular group of projects, by displacement of the button 35 of any set of the time controllers. That particular instrumentality will at once be connected with the time shaft to indicate lapsed period of time. At the expiration of time, properly allocated to any one project the reset button may be depressed to zero, the dials associated with the window indicating that lapsed period of time, while another group of instrumentalities may be energized by the depression of their buttons 35 to record a lapsed period assignable to some other project. In considering the present invention it will be understood that the invention is not limited nor confined to any specific horological instrument for energizing the shaft 21, nor is the structural arrangement of the cabinet a dominating factor of the present inventive concept. Thus in the practice of the present invention, numerous changes, modifications and the full use of equivalents may be resorted to without departing from the spirit or scope of the invention, as outlined in the appended claims.

What I claim is:

1. A lapsed time indicator, including a chronometer, a shaft driven by said chronometer, a bevel gear on said shaft, a longitudinally slidable second shaft right angularly disposed with respect to said first mentioned shaft, a bevel gear on said second shaft engageable upon slidable movement of said second shaft toward said first mentioned shaft with the bevel gear of said first mentioned shaft, whereby said first mentioned shaft will rotate said second mentioned shaft, a timing mechanism, a bevel gear on said timing mechanism, a second bevel gear on said second shaft, said second bevel gear on said second shaft being engageable with the bevel gear of said timing mechanism when said second shaft is moved to engage its bevel gear with the bevel gear of said first mentioned shaft together with a third shaft parallel with said second mentioned shaft longitudinally slidable with respect thereto, a bevel gear on said third shaft, and a second bevel gear on said timing mechanism engageable by the bevel gear of said third shaft upon slidable movement of said third shaft.

2. The device as set forth in claim 1, further including tie means between said second and third shafts providing for equal and opposite simultaneous slidable motion thereof.

References Cited in the file of this patent

UNITED STATES PATENTS

| | | |
|---|---|---|
| 128,225 | Harris | June 25, 1872 |
| 657,167 | King | Sept. 4, 1900 |
| 1,269,218 | Ross | June 11, 1918 |
| 1,593,637 | Miller | July 27, 1926 |
| 2,233,368 | Newman | Feb. 25, 1941 |
| 2,368,761 | Hogan | Feb. 6, 1945 |
| 2,398,015 | Leathers | Apr. 9, 1946 |
| 2,539,754 | Rettinger et al. | Jan. 30, 1951 |